(12) United States Patent
Lee et al.

(10) Patent No.: US 9,280,330 B2
(45) Date of Patent: Mar. 8, 2016

(54) APPARATUS AND METHOD FOR EXECUTING CODE

(71) Applicant: SAMSUNG ELECTRONICS CO., LTD., Suwon-si (KR)

(72) Inventors: Jin-Seok Lee, Seoul (KR); Seong-Gun Kim, Yongin-si (KR); Dong-Hoon Yoo, Seongnam-si (KR); Seok-Joong Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/230,462

(22) Filed: Mar. 31, 2014

(65) Prior Publication Data

US 2014/0344793 A1    Nov. 20, 2014

(30) Foreign Application Priority Data

May 15, 2013  (KR) .......................... 10-2013-0055256

(51) Int. Cl.
*G06F 9/45*  (2006.01)

(52) U.S. Cl.
CPC ...................................... *G06F 8/452* (2013.01)

(58) Field of Classification Search
None
See application file for complete search history.

(56) References Cited

U.S. PATENT DOCUMENTS

| 5,367,651 A * | 11/1994 | Smith et al. ................... 717/149 |
| 2009/0064112 A1 | 3/2009 | Inagaki et al. |

FOREIGN PATENT DOCUMENTS

| JP | 2011-221656 A | 11/2011 |
| KR | 10-2004-0044655 A | 5/2004 |
| KR | 10-2007-0110898 A | 11/2007 |
| WO | 2006/095155 A1 | 9/2006 |

* cited by examiner

*Primary Examiner* — Qamrun Nahar
(74) *Attorney, Agent, or Firm* — Sughrue Mion, PLLC

(57) ABSTRACT

An apparatus and method for executing code are provided. The apparatus includes a memory manager that allocates a stack in memory to store processed data that needs to be retained; a loop generator that divides program code programmed to be processed in parallel into regions based on a barrier function, transforms a region that includes the processed data that needs to be retained in the stack into a first coalescing loop, and transforms a region that uses the processed data stored in the stack into a second coalescing loop such that the transformed program code may be serially processed; and a loop changer that reverses a processing order of the second coalescing loop in comparison to a processing order of the first coalescing loop.

18 Claims, 10 Drawing Sheets

APPARATUS AND METHOD FOR EXECUTING CODE

CROSS-REFERENCE TO RELATED APPLICATION

This application claims priority from Korean Patent Application No. 10-2013-0055256, filed on May 15, 2013 in the Korean Intellectual Property Office, the entire disclosure of which is incorporated herein by reference for all purposes.

BACKGROUND

1. Field

Exemplary embodiments relate to an apparatus and method for executing code.

2. Description of the Related Art

In a processor having an architecture without a parallel execution environment, program code with parallelism should be serialized and executed. One method for serializing program code is a work-item coalescing technique.

The method for coalescing the work-item enables all work-items included in one work-group to be transformed into a coalescing loop and executed in one computing unit. That is, to avoid an unexpected result caused by changing an execution order of program code by program code serialization, the method transforms each of a plurality of code regions, which is separated based on a barrier function, into a coalescing loop, and forces the processor to follow the execution order.

Using the method for coalescing the work-item, the data generated prior to the barrier function is only used within the corresponding coalescing loop. But after finishing execution of the coalescing loop, the data may not be retained in the coalescing loop. So every time the coalescing loop is executed, the data that needs to be retained with heap architecture is stored using dynamic memory allocation (malloc( )).

The method for coalescing the work-item generates overhead for dynamically allocating and returning memory. Also, in a processor with an architecture incapable of dynamic memory allocation, memory is consumed to store the data that needs to be retained.

SUMMARY

According to an aspect of an exemplary embodiment, there is provided an apparatus for executing code, the apparatus including a memory manager configured to allocate a stack in memory to store processed data that needs to be retained; a loop generator configured to divide program code programmed to be processed in parallel into a plurality of regions based on a barrier function, transform a region of the plurality of regions that includes the processed data that needs to be retained in the stack into a first coalescing loop, and transform a region of the plurality of regions that uses the processed data stored in the stack into a second coalescing loop such that the transformed program code may be serially processed; and a loop changer configured to reverse a processing order of the second coalescing loop in comparison to a processing order of the first coalescing loop.

The apparatus may further include a loop processor configured to store the processed data of the first coalescing loop that needs to be retained in the stack, and in response to the first coalescing loop finishing its processing, output the processed data stored in the stack, and process the second coalescing loop.

The loop changer may insert a push code in the first coalescing loop to store the processed data in the stack, and insert a pop code in the second coalescing loop to output the processed data stored in the stack.

The memory manager may statically allocate the stack to the memory. The memory manager may determine a size of the stack to be allocated in the memory based on a size of the processed data stored in the stack. The memory manager may detect a number of the first coalescing loops that include the processed data that needs to be retained and generate a number of stacks equal to the detected number of detected first coalescing loops. In case that a plurality of stacks exist, the memory manager may further include a stack management module configured to determine to which stack to store the processed data of the first coalescing loop.

The program code may be programmed in Open Computing Language (OpenCL).

According to an aspect of another exemplary embodiment, there is provided a method for executing code, the method including dividing program code programmed to be processed in parallel into a plurality of regions based on a barrier function, transforming a region of the plurality of regions that includes processed data that needs to be retained into a first coalescing loop, and transforming a region of the plurality of regions that uses the processed data of the first coalescing loop into a second coalescing loop; reversing a processing order of the second coalescing loop in comparison to a processing order of the first coalescing loop; and inserting a push code in the first coalescing loop, and a pop code in the second coalescing loop.

The method may further include allocating a stack in memory to store the processed data of the first coalescing loop that needs to be retained.

The method may further include, in response to the push code of the first coalescing loop being executed, storing the processed data in the stack; and in response to the first coalescing loop finishing its processing and the pop code of the second coalescing loop being executed, outputting the processed data stored in the stack to process the second coalescing loop.

The storing of the processed data in the stack may include, in case a plurality of stacks exist, determining to which stack to store the processed data among the plurality of stacks.

The allocating of the stack to the memory may further include determining a size of the stack to be allocated in the memory based on a size of the processed data that needs to be retained, wherein the stack is allocated in the determined size. The allocating of the stack to the memory may further include detecting a number of the first coalescing loops that include the processed data to be retained; and allocating a number of stacks equal to the detected number of the first coalescing loops. The allocating of the stack in the memory may include statically allocating the stack to the memory.

The method may further include, in response to the transformed program code finishing its processing, deallocating the stack allocated in the memory.

The program code may be programmed in Open Computing Language (OpenCL).

According to an aspect of another exemplary embodiment, there is provided a non-transitory computer readable medium storing a program causing a computer to execute a method for executing code, the method including dividing program code programmed to be processed in parallel into a plurality of regions based on a barrier function, transforming a region of the plurality of regions that includes processed data that needs to be retained into a first coalescing loop, and transforming a region of the plurality of regions that uses the processed data of the first coalescing loop into a second coalescing loop; reversing a processing order of the second coalescing loop in comparison to a processing order of the first coalescing loop; and inserting a push code in the first coalescing loop, and a pop code in the second coalescing loop.

The method may further include allocating a stack in memory to store the processed data of the first coalescing loop that needs to be retained.

The method may further include, in response to the push code of the first coalescing loop being executed, storing the processed data in the stack; and in response to the first coalescing loop finishing its processing and the pop code of the second coalescing loop being executed, outputting the processed data stored in the stack to process the second coalescing loop.

The storing of the processed data in the stack may include, in case a plurality of stacks exist, determining to which stack to store the processed data among the plurality of stacks.

The allocating of the stack to the memory may further include determining a size of the stack to be allocated in the memory based on a size of the processed data that needs to be retained, wherein the stack is allocated in the determined size. The allocating of the stack to the memory may thither include detecting a number of the first coalescing loops that include the processed data to be retained; and allocating a number of stacks equal to the detected number of the first coalescing loops. The allocating of the stack in the memory may include statically allocating the stack to the memory.

The may further include, in response to the transformed program code finishing its processing, deallocating the stack allocated in the memory.

The program code may be programmed in Open Computing Language (OpenCL).

Other features and aspects may be apparent from the following detailed description, the drawings, and the claims.

BRIEF DESCRIPTION OF THE DRAWINGS

The above and/or other aspects will become apparent and more readily appreciated from the following description of exemplary embodiments, taken in conjunction with the accompanying drawings in which.

Figure 1:
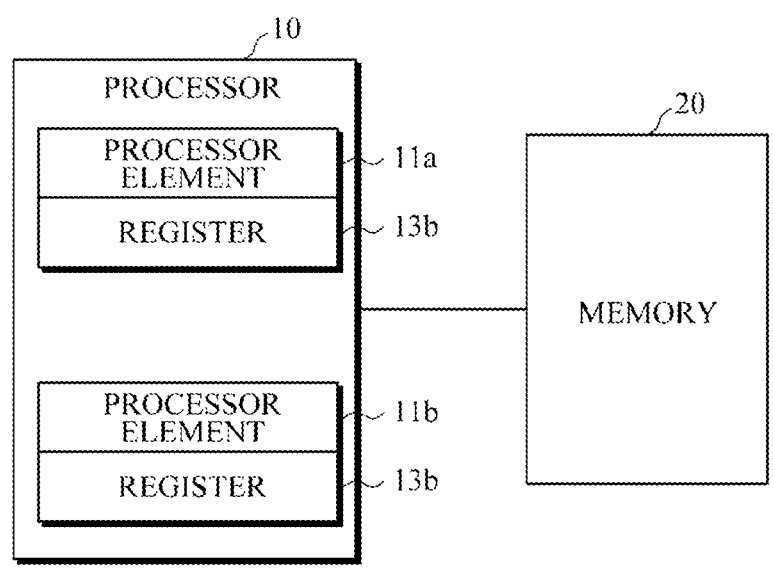
FIG. 1 illustrates an architecture of a system that transforms program code programmed to be processed in parallel into a form that may be serially processed.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described according to exemplary embodiments. Accordingly, various changes, modifications, and equivalents of the methods, apparatuses, and/or systems according to the exemplary embodiments described herein will be suggested to those of ordinary skill in the art. Also, descriptions of well-known functions and constructions may be omitted for increased clarity and conciseness.

FIG. 1 illustrates an architecture of a system that transforms program code, programmed to be processed in parallel, into a form that may be serially processed, according to an exemplary embodiment.

Referring to FIG. 1, a processor 10 fetches data stored in a memory 20, and transforms program code, programmed to be processed in parallel, into a form that may be serially processed, and executes the transformed program code. Here, the program code may indicate source code programmed in Open Computing Language (OpenCL), which is an open source general-purpose computing framework executed across heterogeneous platforms consisting of many central processing units (CPUs), graphics processing units (GPUs), and other processors 10, etc.

The program code programmed to be processed in parallel may include at least one code region. Each code region may include a plurality of work-items, which should be processed in parallel by the processor 10. The work-item may include at least one statement. If the number of processor elements 11 in the processor 10 is less than the number of the work-items which are included in the program code and should be processed in parallel, the processor 10 transforms the plurality of work-items into a form that may be serially processed, and then processes the work-items in order. For example, if the processor 10, including two processor elements 11a and 11b, processes the program code programmed to process ten work-items in parallel at the same time, the processor 10 transforms each code region into a coalescing loop to enable the ten work-items to be processed by the two processor elements 11a and 11b, and processes the coalescing loop.

For convenience of description, the coalescing loop with processed data to be retained is referred to as "a first coalescing loop." Also, a coalescing loop outputting and using processed data retained in a stack is referred to as "a second coalescing loop." Here, the processed data to be retained indicates the processed data to be stored for use by the second coalescing loop among one or more results of the first coalescing loop. Hereinafter, the processed data to be retained is described as one datum; however, the coalescing loop can store the plurality of processed data. In addition, the first coalescing loop and the second coalescing loop are described separately; however, it should be understood that the coalescing loop which outputs processed data that needs to be retained using the retained processed data, may serve as both the first coalescing loop and the second coalescing loop.

In an embodiment, if a system does not support dynamic memory allocation, the system may statically allocate a stack to memory 20, transform a program into a form that may be serially processed, and execute the transformed program. At this time, if all the processed data of the coalescing loop stored in the stack are used, the stack may store the processed data of another coalescing loop. Likewise, by reusing the stack, the system does not need to allocate the memory 20 to store the processed data of every coalescing loop, and thereby can efficiently use the memory 20.

The memory 20 in FIG. 1 is illustrated as being located outside of the processor 10; however, in some cases, the memory 20 may be located inside the processor 10. Furthermore, it should be understood as a broad concept that the memory 20 may include all the devices which can store a processed result that needs to be retained, such as a main memory unit, L1 cache, L2 cache, and a virtual memory, etc. The processor 10 may also include register 13a and register 13b.

Figure 2:
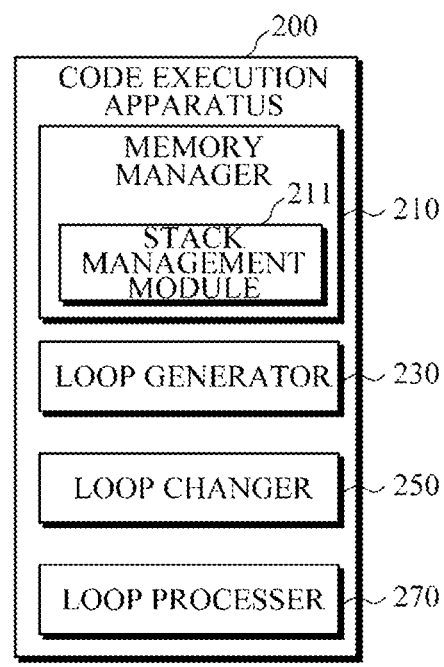
FIG. 2 is a diagram illustrating an exemplary apparatus for executing code that transforms program code, programmed to be processed in parallel, into a form that may be serially processed, and executes the transformed program code.

FIG. 2 is a diagram illustrating an apparatus for executing code that transforms program code, programmed to be processed in parallel, into a form that may be serially processed, and executes the transformed program code, according to an exemplary embodiment.

In the system of FIG. 1 for transforming program code into a form that may be serially processed and executing the transformed program code, a code execution apparatus 200 is described hereafter referring to FIG. 2. Here, the code execution apparatus 200 may be executed by some elements of the processor (as illustrated in FIG. 1). Also, if the apparatus 200 includes a plurality of processors, the code execution apparatus 200 may be executed by one or many processors.

Referring to FIG. 2, the code execution apparatus 200 includes a loop generator 230, a loop changer 250, a memory manager 210, and a loop processor 270.

Figure 3A:
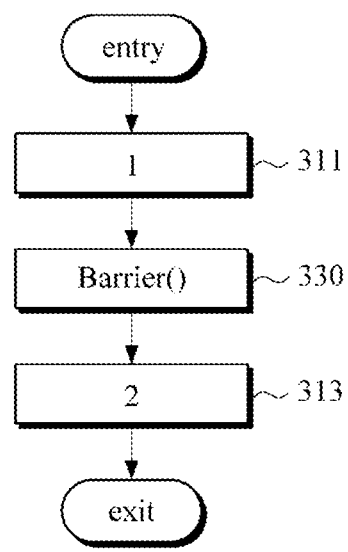
FIGS. 3A and 3B are diagrams illustrating an example of transforming program code, programmed to be processed in parallel, into a form that may be serially processed based on a work-item coalescing technique.
Figure 3B:
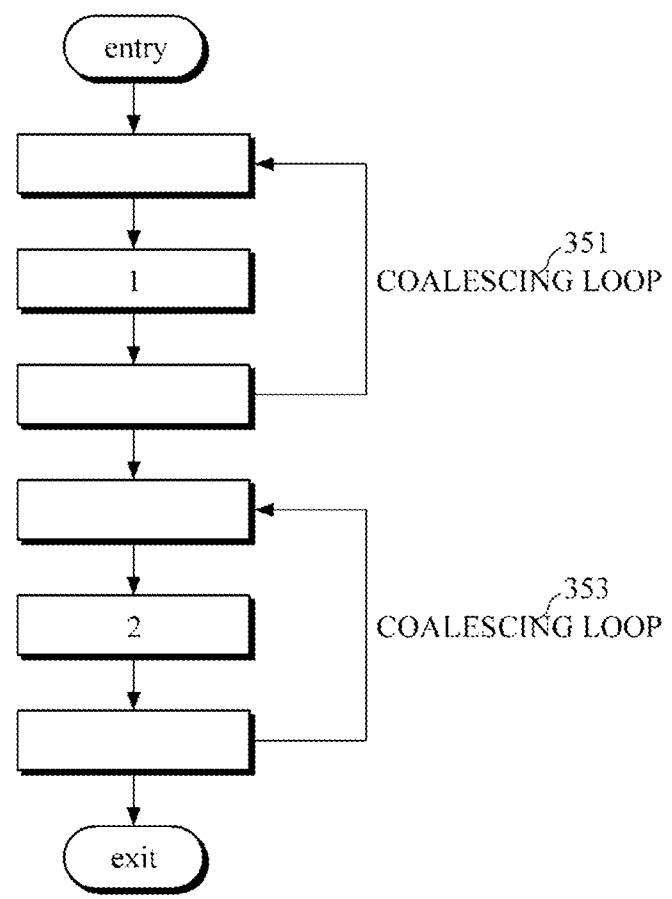

FIGS. 3A and 3B are diagrams illustrating an example of transforming program code, programmed to be processed in parallel, into a form that may be serially processed based on a work-item coalescing technique.

The loop generator 230 in FIG. 2 transforms program code, programmed to be processed in parallel, into a form that may be serially processed based on a work-item coalescing technique. The loop generator 230 divides program code into a plurality of code regions based on a barrier function, and transforms each of the plurality of code regions into the coalescing loop.

Referring to FIGS. 3A and 3B, transformation of program code into a form that may be serially processed based on the work-item coalescing technique by the loop generator 230 is specifically described hereafter. FIG. 3A is a diagram illustrating program code before being transformed by the loop generator 230. The program code consists of the barrier function 330 and the code regions 311 and 313 that are divided by the barrier function 330. Each code region 311 and 313 includes a plurality of work-items which are processed in parallel by the processor. Here, the work-item may include at least one statement. The barrier function 330 may synchronize the plurality of work-items processed in parallel at the same time and enable the program code to be executed in order. In other words, the barrier function 330 avoids processing a next code region 313 before processing is completed for all of the plurality of work-items processed in parallel in code region 311. Through such work-item synchronization, the program code may be processed in order, even during parallel processing.

FIG. 3B is a diagram illustrating an example of transforming program code into a form that may be serially processed using a loop generator 230. Referring to FIGS. 3A and 3B, the loop generator 230 divides program code into a plurality of code regions 311 and 313 based on the barrier function 330, and transforms each of the code regions 311 and 313 into coalescing loops 351 and 353. Here, the coalescing loop binds the work-items in a loop to enable the plurality of work-items of each code region to be serially processed in a processor element. Likewise, binding and processing the work-items in the loop may decrease overhead, such as a context switch and a statement call, etc. The work-item loop may be a triply nested loop.

Figure 4:
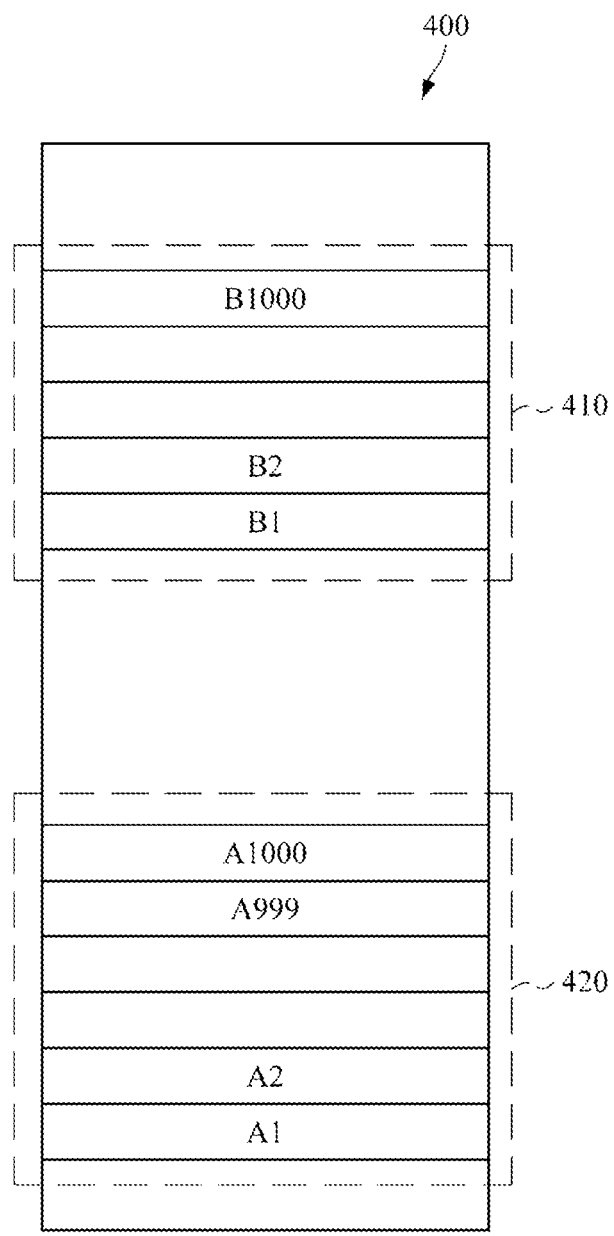
FIG. 4 is a diagram illustrating a stack allocated to memory.

FIG. 4 is a diagram illustrating a stack allocated to memory.

Referring to FIG. 2 again, a memory manager 210 allocates a stack to memory to store data that needs to be retained. The memory manager 210 allocates a specific region of the memory as the stack to store processed data of a first coalescing loop. The memory manager 210 may statically allocate the stack to the memory. Accordingly, prior to processing each separate coalescing loop, the memory manager 210 does not need to dynamically allocate the memory to store data that needs to be retained, so the memory manager 210 can reduce overhead caused by dynamically allocating the memory.

The memory manager 210 may determine a stack size based on a size of the processed data of the first coalescing loop. The stack size is larger than the largest processed data among the plurality of the first coalescing loops that store the processed data in the stack. Referring to FIG. 4, for example, if each processed data item "A" stored in the stack 420 is 8 bytes, the stack 420 may have a size of 8 Kbytes to store 1000 "A" data items. After the 8 Kbytes of processed data is output, in a case where 1000 items of 10-byte processed data "B" of another coalescing loop are stored, the stack 410 is allocated in the 10-Kbyte size, and also the processed data "B" is generated in a storable size.

The memory manager 210 may determine the number of the stacks to be generated. The memory manager 210 detects the number of the first coalescing loops that store the processed data at the same time, and determines the number of the stacks to be generated based on the number of the detected coalescing loops. Referring to FIG. 4, for example, in a case in which the second coalescing loop uses the plurality of the processed data "A" and "B", a stack manager may allocate two stacks 410 and 420 to memory 400. In another embodiment, if the processed data "B" of the second coalescing loop, processed after the processed data "A" of the first coalescing loop stored in the stack is popped, should be retained, the stack manager may allocate the two stacks 410 and 420 to the memory 400. Here, the stack 420 is used for storing the processed data "A" of the first coalescing loop, and the other stack 410 is used for storing the processed data "B" of the second coalescing loop. However, after the processed data "A" of the stack, which stores the processed data of the first coalescing loop, is all output and used, the processed data of another coalescing loop may be stored.

The memory manager 210 may further include a stack management module 211 to determine the stack for retaining the processed data of the first coalescing loop. In a case where a plurality of stacks for storing the processed data of the coalescing loop is generated, the stack management module 211 determines to which stack a processing result of the coalescing loop is stored. For the determination, the stack management module 211 may monitor IO data of each stack.

A loop changer 250 retains the processing result of the coalescing loop in the stack generated by the memory manager 210, and transforms each coalescing loop to output and use the processing result of the coalescing loop retained in the stack. More specifically, because of IO scheduling properties of a first in last out (FILO) stack, the memory manager 210 changes a processing order of the second coalescing loop in reverse to the processing order of the first coalescing loop. That is, because the processed data inputted at first in the stack is output last, and the processed data inputted last is output at first, the processing order of the second coalescing loop needs to be changed in reverse to the processing order of the first coalescing loop.

In addition, the loop changer 250 inserts a push code in the first coalescing loop to store the processed data, which needs to be retained in the stack. Then, the loop changer 250 inserts a pop code in the second coalescing loop to output the processed data, which is retained in the stack.

A loop processor 270 processes the coalescing loop in order, which is transformed by the loop changer 250; more specifically, the first coalescing loop. At this time, upon encountering a push code, which stores the processed data that needs to be retained among the processed data of the first coalescing loop in the stack, the loop processor 270 stores the processing result in the stack. Then, after the first coalescing loop ends, the loop processor 270 processes the second coalescing loop. When encountering a pop code while processing the second coalescing loop, the loop processor 270 outputs the processed data stored in the stack, and continuously processes the coalescing loop using such processed data. Likewise, in processing each coalescing loop, overhead generated by dynamic memory allocation may be prevented by storing the processing result of the coalescing loop in the stack. Moreover, in executing program code that has been transformed so that it may be serially processed based on the work-item coalescing technique in devices that does not support dynamic memory allocation, because the loop processor 270 does not need to allocate the memory for each coalescing loop processed data that needs to be stored, the memory can be effectively used.

Figure 5:
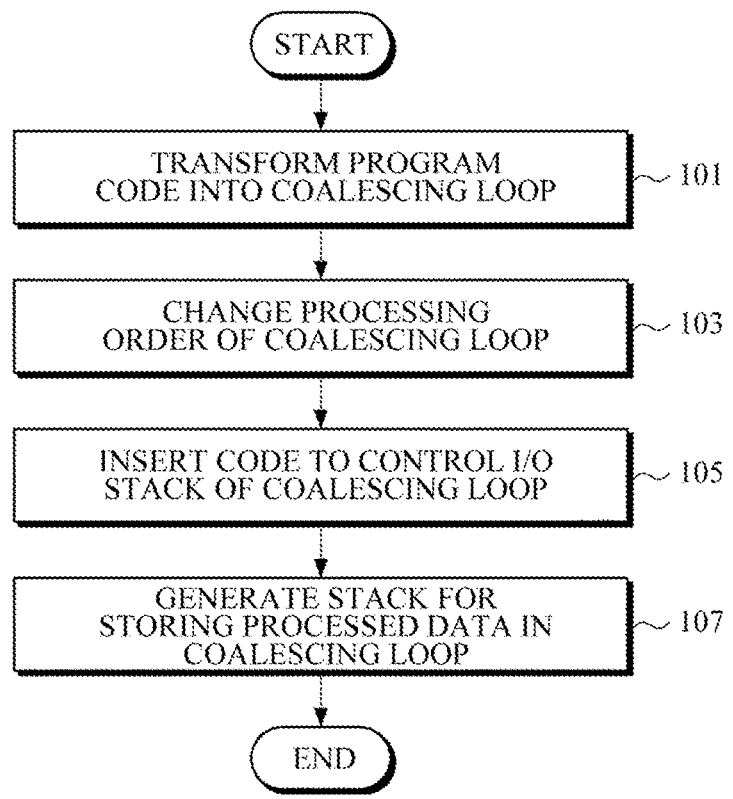
FIG. 5 is a diagram illustrating an example of a method for transforming program code programmed to be processed in parallel into a form that may be serially processed.

FIG. 5 is a diagram illustrating a method for transforming program code that is programmed to be processed in parallel into a form that may be serially processed, according to an exemplary embodiment.

Figure 6A:
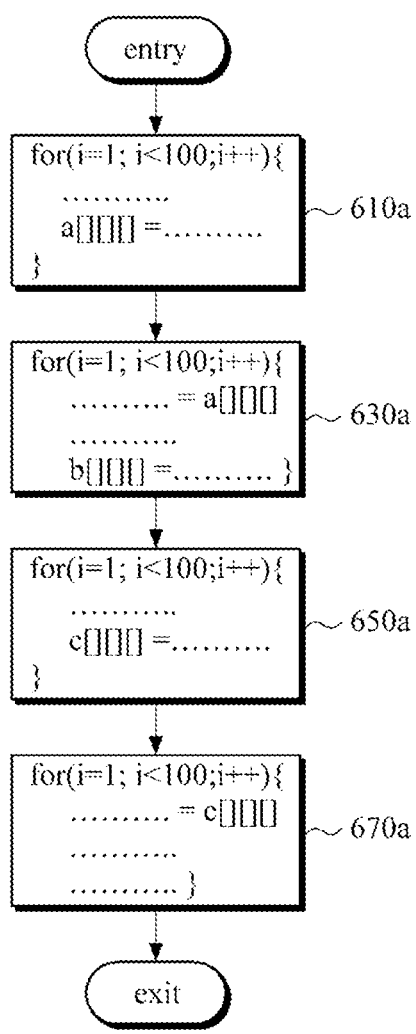
FIGS. 6A, 6B, and 6C are diagrams illustrating examples of methods for transforming program code programmed to be processed in parallel into a form that may be serially processed.
Figure 6B:
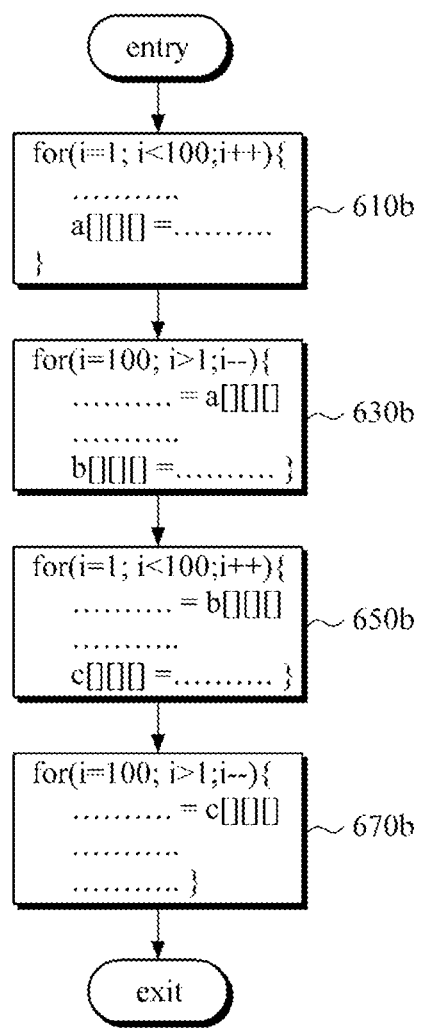
Figure 6C:
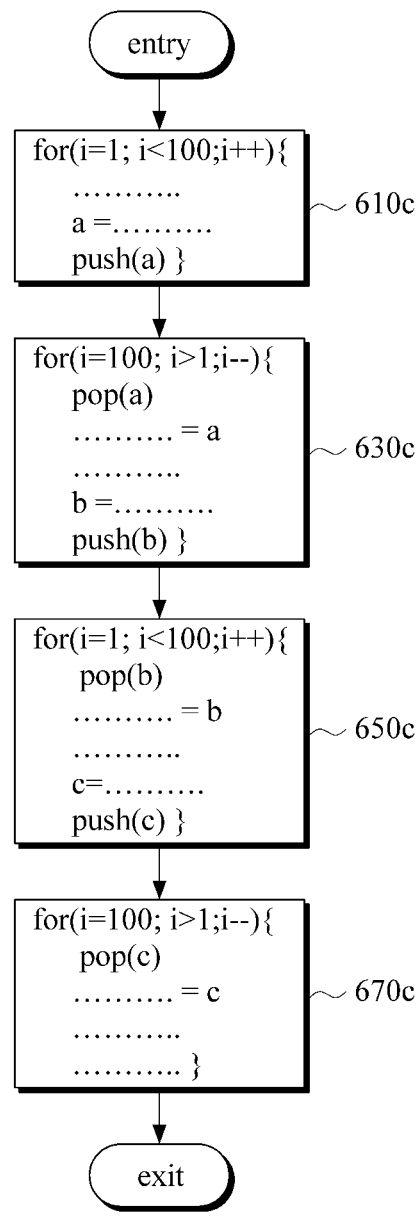

FIGS. 6A, 6B, and 6C are diagrams illustrating methods for transforming program code that is programmed to be processed in parallel into a form that may be serially processed, according to other exemplary embodiments.

Referring to FIG. 5, the apparatus for executing code transforms the program code into the coalescing loop in block 101. At this time, the apparatus divides regions of the program code into a plurality of the code regions based on a barrier function. Here, the barrier function avoids processing the next code region before processing is finished for all of the plurality of work-items processed in parallel. Dividing the plurality of the code regions based on the barrier function, the apparatus divides the plurality of the work-items processed in parallel into each group. The apparatus transforms the plurality of the divided code regions into the coalescing loop. Likewise, binding the plurality of the work-items in one loop, and creating the coalescing loop, decreases overhead caused by processing the work-item serially.

Referring to FIGS. 5 and 6A, for example, the apparatus divides the program code, which includes three barrier functions, into four code regions based on the barrier functions in block 101, and transforms each code region into the coalescing loops 610a, 630a, 650a, and 670a. By transforming one hundred work-items to be processed in parallel in each code region into one coalescing loop, the apparatus transforms the program code to be processed in parallel into a form that may be serially processed, and processes the transformed program code. Here, because the plurality of the work-items processed in the coalescing loop is designed to be processed in parallel, the processing result of each work-item may not affect other work-items. So, it should be understood that transforming work-items into the coalescing loop cannot affect the processing result of each code region.

Referring to FIG. 5 again, the apparatus for executing a code changes a processing order of the coalescing loop in block 103. The apparatus divides the coalescing loop into the first coalescing loop that includes the processed data to be retained, and the second coalescing loop that uses the retained processed data of the first coalescing loop. Afterwards, the apparatus changes the processing order of the second coalescing loop in reverse to the first coalescing loop. By changing the processing order of the loop, the apparatus enables the second coalescing loop to pop the processed data stored in the stack, and process the work-item.

Referring to FIGS. 5 and 6B, for example, the apparatus changes the execution order of the second coalescing loop in reverse to the first coalescing loop in block 103. The execution order of a coalescing loop 630b is changed in reverse to the execution order of a coalescing loop 630a in the first coalescing loop. However, in the coalescing loop 650b, because the execution order of the coalescing loop 630b has already been changed in reverse to the coalescing loop 630a in first coalescing loop, the execution order of a coalescing loop 650b does not need to be changed. Likewise, if the coalescing loop has the processed data that newly needs to be retained using the retained data, the coalescing loop may be relevant to both the first coalescing loop and the second coalescing loop. Meanwhile, because the plurality of the work-items processed in the coalescing loops 610b, 630b, 650b, and 670b is designed to be processed in parallel, and the processing result of each work-item does not affect other work-items, it should be understood that changing the execution order of the coalescing loops does not affect the processing result of each code region.

Referring to FIG. 5 again, the apparatus for executing a code inserts a code to control stack input/output of the coalescing loop in block 105. The apparatus inputs a push code in the first coalescing loop in order to store the processed data that needs to be retained in the stack, and inserts a pop code in the second coalescing loop so as to output the processed data retained in the stack.

Referring to FIG. 6C, for example, the apparatus inserts push codes "push(a)," "push(b)," and "push(c)," respectively, into coalescing loops 610c, 630c, and 650c, each of which includes the processed data that needs to be retained, so as to store the processed data. Then, the apparatus inserts pop codes "pop(a)," "pop(b)," and "pop(c)" into the coalescing loops 630c, 650c, and 670c, each of which uses the processed data retained in the stack, so as to output the retained processed data.

Referring to FIG. 5 again, the apparatus generates a stack for storing the processed data of the coalescing loop in memory in block 107. The apparatus allocates, to memory, a stack for storing data, which needs to be retained, of the first coalescing loop. Here, the stack may be statically allocated. Likewise, by statically allocating the stack prior to processing the coalescing loop, the apparatus may decrease overhead caused by memory allocation and deallocation used to dynamically store the processed data of the first coalescing loop while executing the program.

In addition, the apparatus may further include a method of determining a size of the stack to be allocated to the memory in block 107 (not illustrated). Here, the apparatus may determine the size of the stack according to a whole size of the processed data that needs to be retained in the first coalescing loop. Referring to FIG. 6A, for example, each coalescing loop has one hundred pieces of processed data. Thus, the stack should be allocated in a size large enough to store one hundred pieces of processed data. Also, if each processed data item of the coalescing loop 610c is 4-bytes; 630c, 5-bytes; 650c, 6-bytes, the stack is allocated in a size larger than 600-bytes, enough to store the processed data of the coalescing loop 650c.

Also, the apparatus may further include a method of determining how many stacks to be allocated to the memory in block 107 (not illustrated). The apparatus may detect the number of the first coalescing loops that should simultaneously store the processed data, and determine the number of the stacks to be generated based on the number of the detected coalescing loops. Referring to FIGS. 5 and 6A, for example, the coalescing loop 630c may output the processed data "a" of the coalescing loop 610c stored in the stack, and store the processed data "b" in a stack, based on the processed data "a." Accordingly, the apparatus may determine that two stacks are needed at the same time, and generate two stacks.

FIGS. 6A, 6B, and 6C are illustrated as being processed in order, but the order of each operation may be changed. Also, it is understood that each operation may be processed in one step.

Figure 7:
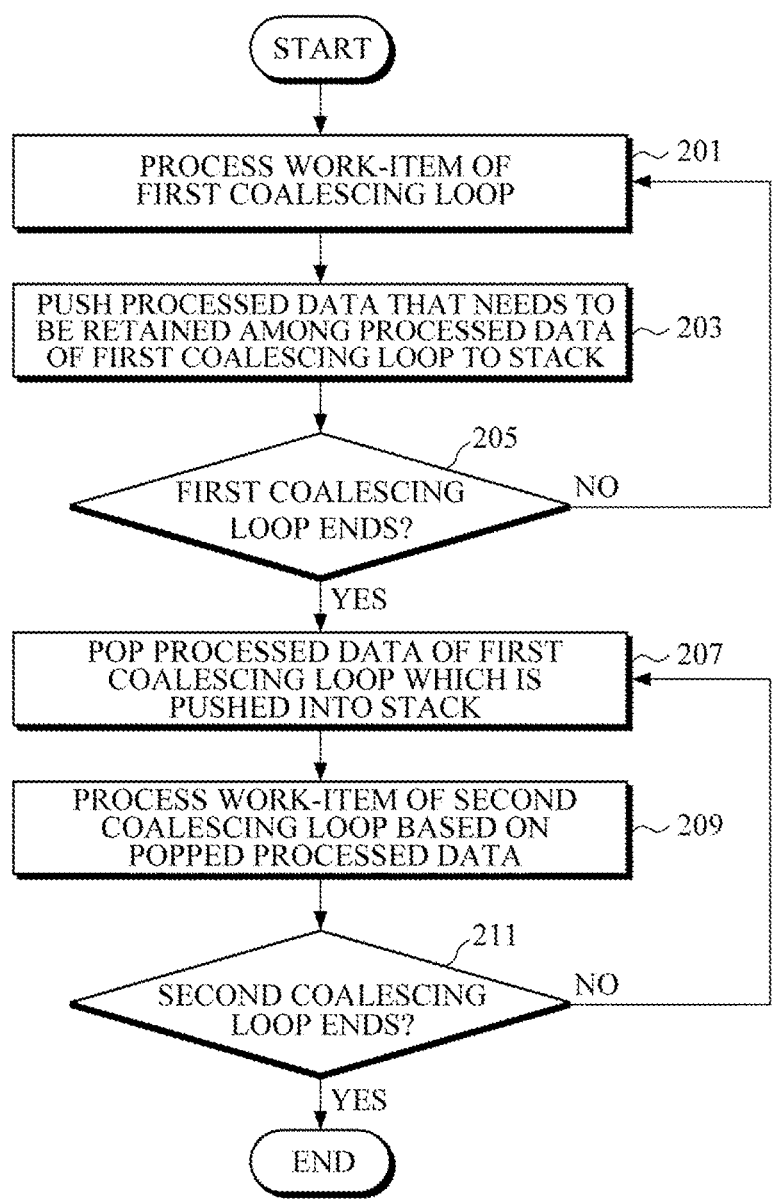
FIG. 7 is a flowchart illustrating another example of a method for executing program code, programmed to be processed in parallel, that has been transformed into a form that may be serially processed.

FIG. 7 is a flowchart illustrating a method for executing program code programmed to be processed in parallel that has been transformed into a form that may be serially processed, according to another exemplary embodiment.

As described above in FIGS. 6A, 6B, and 6C, FIG. 7 is an exemplary flowchart for specifically describing an execution order of code derived from transforming program code, programmed to be processed in parallel, into a form that may be serially processed. Although not illustrated in FIG. 7, it should be understood that after transforming the program code to be processed in parallel based on the method for transforming the code in FIG. 6, the method for executing the code is described in FIG. 7. For convenience of description, only a first and a second coalescing loop processing operations are described in FIG. 7; however, more coalescing loops can be processed according to the same principle.

The apparatus for executing code processes work-items of the first coalescing loop in block 201. After the work-items of the first coalescing loop are executed, the apparatus pushes processed data that needs to be retained to the stack in block 203. Afterwards, the apparatus determines whether the first coalescing loop has ended in block 205. At this time, if the first coalescing loop is determined not to have finished processing because the work-items of the first coalescing loop are not fully processed, processing of the first coalescing loop may continue in block 201. In another embodiment, which is not illustrated in FIG. 7, if a plurality of the stacks is allocated to memory, the apparatus may further include a method for determining the stack to store the processed data of the first coalescing loop.

On the other hand, in block 205, if processing of the first coalescing loop is determined to have finished because all of the work-items are fully processed flow may proceed to block 207 and the processed data that has been pushed to the stack may be popped. Then, based on the processed data, which has been popped in block 207, the apparatus processes the work-items of the second coalescing loop in block 209. Then, it is determined whether the second coalescing loop has finished its processing in 211; that is, determining whether the work-items of the second coalescing loop have been fully processed. At this time, if work-items of the second coalescing loop are not fully processed, flow may proceed to block 207, and processing of the second coalescing loop continues. Then, after all of the work-items of the second coalescing loop are fully processed and the second coalescing loop is finished, the apparatus finishes executing the code.

For example, if the code transformed as illustrated in FIG. 6C is executed, the apparatus for executing the code processes the work-items of the coalescing loop 610c, and repeatedly executes pushing and storing the processed data "a" that needs to be retained to the stack one hundred times (1→100).

Then, after popping the processed data retained in the stack, the apparatus repeatedly executes processing the work-items of the coalescing loop 630c one hundred times (100→1).

In the embodiments described above, the apparatus enables program code, which is programmed to be processed in parallel to be processed serially through code transformation. Through such operation, even using a processor that is unable to process the code in parallel, the apparatus can execute the program code programmed to be processed in parallel.

In addition, the apparatus stores the processed data that needs to be retained among the processed data of the coalescing loop, using a stack statically allocated to some predetermined regions of memory. Through those operations, the apparatus can avoid overhead caused by dynamic memory allocation, and also by additional dynamic memory return.

Moreover, by reusing the stack without additionally allocating memory space to store the processed data that needs to be retained for each coalescing loop, the apparatus can retain the processed data of the plurality of the coalescing loops. Accordingly, the memory can be effectively managed in the processor without a structure supporting the dynamic memory allocation.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for executing code, the apparatus comprising:
 a processor;

a memory manager configured to allocate a stack in memory to store processed data that needs to be retained;

a loop generator configured to divide program code programmed to be processed in parallel into a plurality of regions based on a barrier function, transform a region of the plurality of regions that includes the processed data that needs to be retained in the stack into a first coalescing loop, and transform a region of the plurality of regions that uses the processed data stored in the stack into a second coalescing loop such that the transformed program code may be serially processed; and a loop changer configured to reverse a processing order of the second coalescing loop in comparison to a processing order of the first coalescing loop.

2. The apparatus of claim 1, further comprising:

a loop processor configured to store the processed data of the first coalescing loop that needs to be retained in the stack, and in response to the first coalescing loop finishing its processing, output the processed data stored in the stack, and process the second coalescing loop.

3. The apparatus of claim 1, wherein the loop changer inserts a push code in the first coalescing loop to store the processed data in the stack, and inserts a pop code in the second coalescing loop to output the processed data stored in the stack.

4. The apparatus of claim 1, wherein the memory manager statically allocates the stack to the memory.

5. The apparatus of claim 1, wherein the memory manager determines a size of the stack to be allocated in the memory based on a size of the processed data stored in the stack.

6. The apparatus of claim 1, wherein the memory manager detects a number of the first coalescing loops that include the processed data that needs to be retained and generates a number of stacks equal to the detected number of first coalescing loops.

7. The apparatus of claim 1, wherein in case that a plurality of stacks exist, the memory manager further comprises a stack management module configured to determine to which stack to store the processed data of the first coalescing loop.

8. The apparatus of claim 1, wherein the program code is programmed in Open Computing Language (OpenCL).

9. A method for executing code, the method comprising:

dividing program code programmed to be processed in parallel into a plurality of regions based on a barrier function, transforming a region of the plurality of regions that includes processed data that needs to be retained into a first coalescing loop, and transforming a region of the plurality of regions that uses the processed data of the first coalescing loop into a second coalescing loop;

reversing a processing order of the second coalescing loop in comparison to a processing order of the first coalescing loop; and inserting a push code in the first coalescing loop, and a pop code in the second coalescing loop.

10. The method of claim 9, further comprising:

allocating a stack in memory to store the processed data of the first coalescing loop that needs to be retained.

11. The method of claim 10, further comprising:

in response to the push code of the first coalescing loop being executed, storing the processed data in the stack; and in response to the first coalescing loop finishing its processing and the pop code of the second coalescing loop being executed, outputting the processed data stored in the stack to process the second coalescing loop.

12. The method of claim 11, wherein the storing of the processed data in the stack comprises, in case a plurality of stacks exist, determining to which stack to store the processed data among the plurality of stacks.

13. The method of claim 10, wherein the allocating of the stack in the memory further comprises:

determining a size of the stack to be allocated in the memory based on a size of the processed data that needs to be retained, wherein the stack is allocated in the determined size.

14. The method of claim 10, wherein the allocating of the stack in the memory further comprises:

detecting a number of the first coalescing loops that include the processed data to be retained; and allocating a number of stacks equal to the detected number of the first coalescing loops.

15. The method of claim 10, the allocating of the stack in the memory comprises statically allocating the stack to the memory.

16. The method of claim 10, further comprising:

in response to the transformed program code finishing its processing, deallocating the stack allocated in the memory.

17. The method of claim 9, wherein the program code is programmed in open computing language (OpenCL).

18. A non-transitory computer readable medium storing a program causing a computer to execute a method for executing code, the method comprising:

dividing program code programmed to be processed in parallel into a plurality of regions based on a barrier function, transforming a region of the plurality of regions that includes processed data that needs to be retained into a first coalescing loop, and transforming a region of the plurality of regions that uses the processed data of the first coalescing loop into a second coalescing loop;

reversing a processing order of the second coalescing loop in comparison to a processing order of the first coalescing loop; and inserting a push code in the first coalescing loop, and a pop code in the second coalescing loop.

* * * * *